United States Patent
McKinney et al.

(10) Patent No.: US 8,034,214 B2
(45) Date of Patent: Oct. 11, 2011

(54) RECIPROCATING EVAPORATOR

(75) Inventors: Collin McKinney, Durham, NC (US); Rob Musser, Durham, NC (US)

(73) Assignee: Tracera LLC, Elkhart, IN (US)

( * ) Notice: Subject to any disclaimer, the term of this patent is extended or adjusted under 35 U.S.C. 154(b) by 1064 days.

(21) Appl. No.: 11/786,618

(22) Filed: Apr. 12, 2007

(65) Prior Publication Data

US 2009/0065154 A1    Mar. 12, 2009

(51) Int. Cl.
*B01D 1/22* (2006.01)
*B01D 3/02* (2006.01)
*B01D 3/28* (2006.01)
*B01L 9/06* (2006.01)
*B01D 3/10* (2006.01)

(52) U.S. Cl. ......... 159/6.1; 159/11.2; 159/12; 159/13.2; 159/23; 159/43.1; 159/DIG. 16; 159/DIG. 42; 165/115; 165/162; 165/178; 202/170; 202/205; 202/266; 202/269; 202/238; 203/DIG. 2; 210/167.3; 422/562; 422/566

(58) Field of Classification Search ............... 159/6.1, 159/11.2, 12, 13.2, 23, 43.1, DIG. 16, DIG. 42; 165/115, 162, 178; 202/170, 205, 266, 269, 202/238; 203/DIG. 2; 210/167.3; 422/561, 562, 566

See application file for complete search history.

(56) References Cited

U.S. PATENT DOCUMENTS

| | | | | |
|---|---|---|---|---|
| 3,338,798 | A * | 8/1967 | Parr | 203/11 |
| 3,543,717 | A * | 12/1970 | Adachi | 118/695 |
| 4,195,481 | A * | 4/1980 | Gregory | 60/516 |
| 4,780,178 | A | 10/1988 | Yoshida et al. | |
| 5,470,376 | A | 11/1995 | Dube et al. | |
| 5,639,354 | A * | 6/1997 | Zellweger | 202/238 |
| 5,858,178 | A * | 1/1999 | Lautenschlager | 203/73 |
| 5,879,516 | A * | 3/1999 | Kasman | 202/238 |
| 5,919,339 | A | 7/1999 | Ikeda | |
| 6,275,649 | B1 * | 8/2001 | Nagashima et al. | 392/389 |
| 6,740,206 | B2 | 5/2004 | Genser | |
| 2003/0000651 | A1 | 1/2003 | Genser | |
| 2005/0034671 | A1 * | 2/2005 | Ohara | 118/726 |
| 2006/0064992 | A1 * | 3/2006 | Kwon | 62/114 |
| 2008/0210384 | A1 * | 9/2008 | Guthrie | 159/6.1 |

\* cited by examiner

*Primary Examiner* — Virginia Manoharan
(74) *Attorney, Agent, or Firm* — William F. Bahret

(57) ABSTRACT

A reciprocating film type evaporator for solvents and other chemicals which eliminates the need for a large powerful motor, and other associated equipment such as rotary gaskets, by using reciprocation, versus 360 degree rotation.

1 Claim, 2 Drawing Sheets

RECIPROCATING EVAPORATOR

STATEMENT REGARDING FEDERAL SPONSORED RESEARCH OR DEVELOPMENT

This invention was made with Government support under Contract No. HHSN261200522012C awarded by NIH. The Government has certain rights in the invention.

CROSS-REFERENCE TO RELATED APPLICATIONS

Not Applicable

REFERENCE TO SEQUENCE LISTING, ETC.

Not Applicable

BACKGROUND

Evaporators are commonly known in the prior art. These are most generally rotary in nature and are used to evaporate substances, generally solvents, when chemical or pharmaceutical products are concentrated or distilled. With these evaporators, the liquid substances to be evaporated are placed into the hollow chamber of a rotatable flask (vessel), usually submerged in a heating bath of water or oil. By rotating the vessel, a thin liquid film is formed on the inside of the vessel and the substances, especially the solvent, evaporate from this film. Some of the solvent or substance also evaporates directly from the surface of the liquid that is in the rotating vessel. The vapor is conveyed from the vessel by a vacuum line connected to the vessel. Generally the vacuum line is joined to the vessel by a rotatable connection with the connection site being sealed off by a rotary gasket. The negatives associated with prior art evaporators is the amount of space necessary to accommodate all the components, as well as the drawbacks associated with a rotary gasket, necessitated by the 360 degree rotation of the vessel.

Accordingly, an object of the present invention is to provide a reciprocating evaporator used in chemical processes (most notably radiochemistry) which is small, durable, inexpensive to produce and eliminates the need for a rotary gasket, has adjustable rotation, yet provides quality results.

When examining the size of equipment used in a chemical process, in no other field is size as important as in Radiochemistry. Radiochemicals are used in the field of nuclear medicine as tracers in the diagnosis and treatment of many diseases. Some radiochemical processes (as well as many general chemical processes) require the use of an evaporator apparatus for efficient evaporation of solvents. Commercially available prior art evaporators are large and cumbersome. This large size poses a problem in radiochemical syntheses, because these processes must be performed in shielded enclosures, due to the radioactive chemicals in use. These enclosures are very expensive and their price is determined by the volume contained within. Thus, equipment used inside the enclosure should be of minimal size to reduce the enclosure cost and to allow efficient use of shielded space for other components. Unfortunately, the motor drives utilized in prior art evaporators are large because they must overcome the friction found in the rotary gasket that allows a vacuum to be applied to the rotating flask. Further, typical evaporators use rotation consisting of full, repeated 360 degree cycles. Even when space is not a major concern, having a small efficient evaporator would allow any lab to make more efficient use of its space and resources.

Therefore, in light of the shortcomings of the prior devices, there exists a significant demand for an evaporator that is small yet efficient.

BRIEF SUMMARY

The present invention is directed to a film-type evaporator that rotates, in a reciprocating manner, a sealed flask holding a substance to be evaporated, so that the inner surface of the flask is coated with a thin film that evaporates when heated. Flexible tubing attached to the flask allows for introduction of the substance to be evaporated and also suction force to take the evaporated gas from the flask. The motor rotates the flask through a range of reciprocating motion, ideally approaching 360 degrees, eliminating the need for a rotary joint typically found in rotary evaporators. This provides one object of this invention, which is lower cost and space saving. It is a further object of this invention to have some means, such as a slotted disk attached to the motor shaft and an optical sensor, to feed rotation information to an electronic control system that could be remotely located from the rest of the evaporator, when space is at a premium as it is in radiochemical processes, furthering the space saving aspects of this invention. These and other features, aspects and advantages of the present invention will become better understood with reference to the following description, appended claims and accompanying drawing.

DESCRIPTION

The reciprocating evaporator of this invention may be produced by having a closed vessel to contain the liquid substance to be evaporated. The vessel is attached to one, or more, flexible tubes for the purpose of introducing the substance to be evaporated, extracting the resultant vapor, introducing additional solvents into the vessel, and removing the redissolved radiochemical solute. The vessel is also attached to a motor that allows for reciprocating motion of the vessel. This motor can be any reversible type. It is also advantageous to include a motor speed control for optimization of evaporation. A heating source is also provided that directs heat onto the vessel. The heat source could be an oil or water bath, but in the embodiment described here, the heat source is directed hot air. Other embodiments of this device may utilize inductive, microwave, infrared, or other conductive or convective sources. In the embodiment described here, temperature control of the heating source is achieved by sensing the vessel temperature by non-contact infrared thermometry to maintain a desired evaporating vessel temperature. In this embodiment a temperature sensor will be placed in the hot air stream of the heater to measure its output temperature and thereby allow control of its temperature. Other embodiments of this device could sense the vessel temperature by infrared thermometry. In addition, by virtue of its reciprocating movement, the device would allow the use of a wired temperature sensor directly immersed into the vessel liquid without the need for electrical slip ring contacts. In combination, the rotation, which creates a thin film on the interior of the vessel, is then evaporated away by application of heat to the vessel. The resultant gas is then extracted by suction applied to the flexible tubing attached to the vessel.

The invention can be better understood with reference to the attached drawing, illustrating a representative and non-limiting embodiment.

Figure 1:
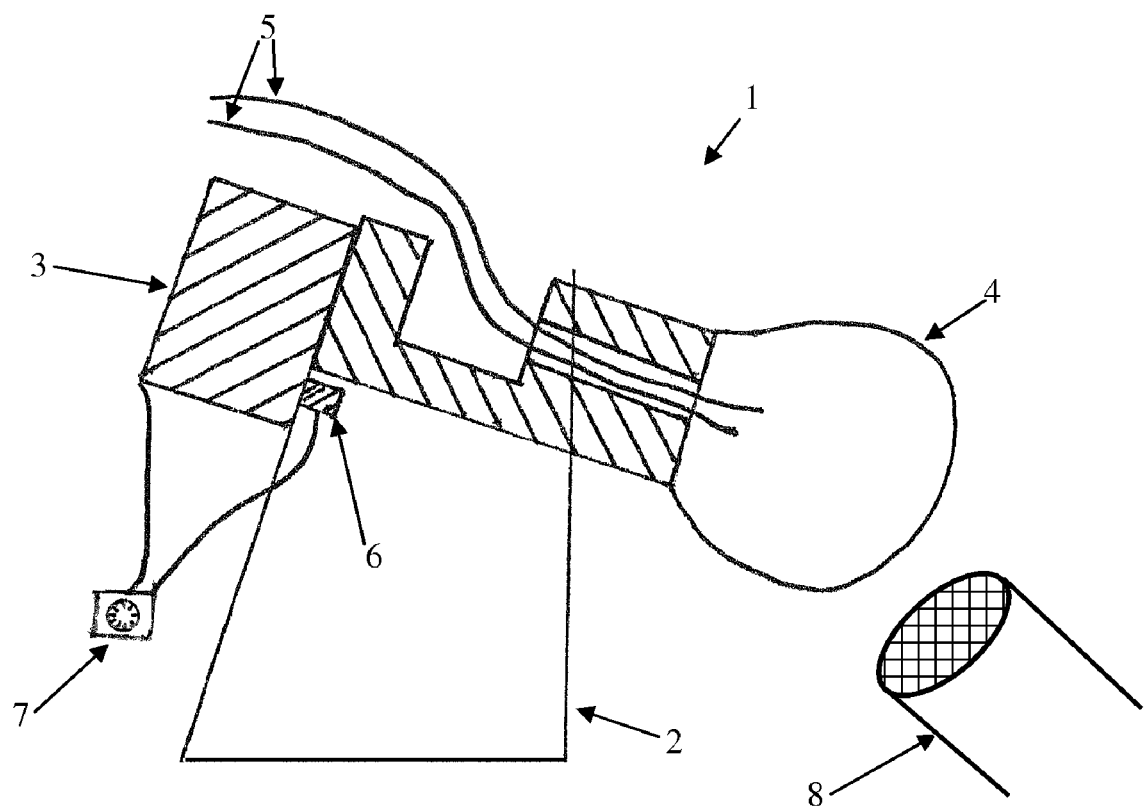
FIG. 1 shows a schematic of one embodiment of the present invention.

FIG. 1 shows a reciprocating evaporator. The reciprocating evaporator, 1, comprises a frame 2 which holds the evaporator at a desired downward angle. Rigidly attached to the frame and at a downward angle is a motor 3 which provides reciprocating action to the vessel 4. The vessel 4 is hollow and is sealed from the ambient air but for one, or more, hollow tubes 5 which are fixedly attached to the vessel through a threaded cap, or similar means, which allow for the passage of chemicals or solvents to be added, evaporated or removed. Attached to the motor 3 is a sensor 6 by which the amount of rotation can be measured and controlled by a controller 7. Attached to the frame 2 or mounted nearby is a heat source 8 directed at the vessel 4.

Figure 2:
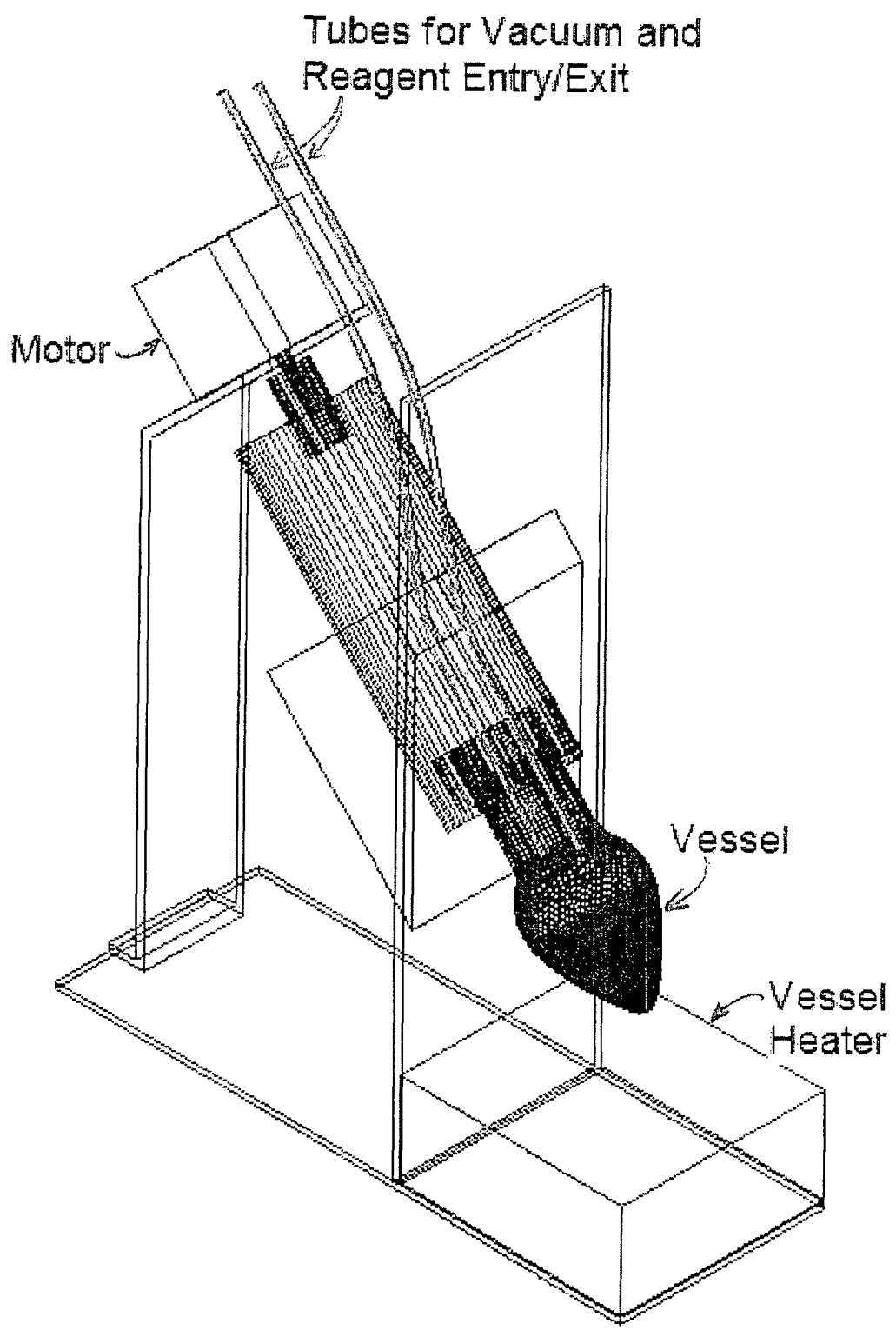
FIG. 2 shows a schematic of one embodiment of the present invention.

In the embodiment shown in FIG. 1, a solvent is introduced to the vessel 4 and the amount of rotation determined by the controller 7, which is always less than 360 degrees due to the reciprocating nature of the motor. In the preferred embodiment, the amount of rotation is approximately 300 degrees. Once rotation has been determined, the heat source 8 is directed at the vessel 4. Film type evaporation takes place and continues until the desired result is reached at which time the heat source 8 is turned off and the rotation is ceased. A similar process is applied when using the embodiment shown in FIG. 2.

Although the present invention has been described in considerable detail with reference to certain preferred versions thereof, other versions are possible. Therefore, the spirit and scope of the appended claims should not be limited to the description of the preferred versions contained herein.

What is claimed is:

1. A reciprocating evaporator comprising:
   a sealed hollow evaporator vessel to hold chemicals or solvents to be evaporated;
   a frame reciprocatingly supporting said vessel at a downward angle;
   a flexible tube extending into said sealed vessel to allow chemicals or solvents to be added to and removed therefrom while said vessel is supported by said frame;
   means connected to said frame for rotating said vessel in a reciprocating manner; and
   means for heating said vessel;
   wherein said means for rotating said vessel includes a reversible motor which allows for a variety of angles of rotation, none of which is more than 360 degrees;
   wherein said frame is sized and shaped for containment in a shielded enclosure; and
   wherein said motor is of lower power than motors used with rotary evaporators having rotary gasket.

* * * * *